United States Patent Office
3,557,104
Patented Jan. 19, 1971

3,557,104
DERIVATIVES OF 7-ACYLAMINO-CEPHALOSPORANIC ACID
Hans Bickel, Binningen, Rolf Bosshardt, Arlesheim, Bruno Fechtig, Binningen, Enrico Menard, Basel, Johannes Mueller, Arlesheim, and Heinrich Peter, Riehen, Switzerland, assignors to Ciba Corporation, New York, N.Y., a corporation of Delaware
No Drawing. Filed Dec. 12, 1967, Ser. No. 689,803
Claims priority, application Switzerland, Dec. 21, 1966, 18,371/66; Oct. 27, 1967, 15,073/67
Int. Cl. C07d 99/24
U.S. Cl. 260—243                    9 Claims

ABSTRACT OF THE DISCLOSURE

Antimicrobially active 7-lower alkoxycarbonylacetylamino-cephalosporanic acids and derivatives and salts thereof.

---

The present invention is concerned with the manufacture of new, therapeutically active derivatives of 7-amino-cephalosporanic acid of the formula (I)
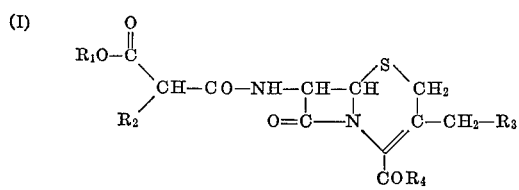

in which $R_1$ represents a lower alkyl radical, $R_2$ hydrogen or a lower alkoxycarbonyl radical, $R_3$ a hydroxyl group, which may be free or esterified by a carboxylic acid, in which ester oxygen atoms may be replaced by sulfur atoms, or a possibly N-substituted carbamoyloxy group in which oxygen atoms may be replaced by sulfur, or a quaternary amino group, and $R_4$ represents a hydroxyl group, and of their salts.

An esterified hydroxyl group $R_3$, in which oxygen atoms may be replaced by sulfur, is derived from a carboxylic acid and is advantageously the acetoxy group, or a monocyclic or dicyclic arylcarbonyloxy, arylthiocarbonyloxy, arylcarbonylmercapto or arylthiocarbonylmercapto group substituted, for example, by lower alkyl, lower alkoxy, lower alkylmercapto or the nitro group or by halogen atoms, being especially the benzoylmercapto group. As further examples for $R_3$ there may be mentioned:

(a) A carbamoyloxy group of the formula

—O—CO—NH—$R_5$ in which $R_5$ stands for an aliphatic, aromatic, araliphatic or heterocyclic radical, especially a linear or branched lower alkyl which may be unsubstituted or substituted, preferably by one or several lower alkoxy groups or halogen atoms, such as the methyl, ethyl or primarily the $\beta$-chlorethyl radical; or (b) A thiocarbamoylmercapto group of the formula

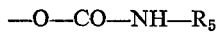

in which $R_5$ has the above meaning and $R_6$ is hydrogen or has the same meaning as $R_5$; or (c) A quaternary amino group in which the quaternary nitrogen atom is, for example, part of an aromatic ring, such as a quinoline, isoquinoline or pyrimidine ring, or especially of an unsubstituted or substituted pyridine ring, for example, of the formula

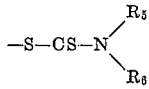

where $R_7$ represents hydrogen or one or several lower alkyl, lower alkoxycarbonyl, carbamoyl or carboxyl groups, or one or several halogen atoms.

The salts of the new compounds are metal salts, especially those of therapeutically useful alkali or alkaline earth metals, such as sodium, potassium or calcium, or of ammonium, or salts with organic bases, for example triethylamine, N-ethylpiperidine, dibenzyl-ethylenediamine or procain. When $R_3$ stands for a basic group, inner salts may be formed.

The new compounds are useful as antimicrobial agents. They act against a wide variety of microorganisms, viz. against both Gram-positive and Gram-negative bacteria, for example, against penicillin-resistant *Staphylococcus aureus*, *Escherichia coli*, *Klebsiella pneumoniae*, *Salmonella typhosa*, *Bacillus subtilis* and *Bacillus megatherium*. They may, therefore, be used for combating infections caused by such microorganisms, and also as additives to animal fodders, as preservatives for victuals or as disinfectants. The way to use them is analogous to that for known penicillins or cephalosporins. Particularly valuable are those compounds in which the acyl radical in position 7 is a di-methoxycarbonyl, mono methoxy-carbonyl- or mono-ethoxycarbonyl-acetyl residue, and $R_3$ represents the acetoxy group, the $\beta$-chloroethylcarbamoyl group, or a pyridinio group which may be unsubstituted or substituted as indicated above.

The new compounds are obtained when a compound of the formula (II)
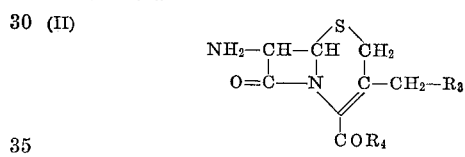

where $R_3$ and $R_4$ have the same meanings as in Formula I—is acylated in known manner on the 7-amino nitrogen atom by the group

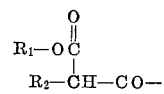

in which $R_1$ and $R_2$ have the same meanings as in Formula I, and, if desired, resulting compounds containing as $R_3$ a free hydroxyl group or a hydroxyl group esterified with a carboxylic acid are converted into one another and, if desired, in a resulting compound in which $R_3$ is a hydroxyl group, esterified by a carboxylic acid, in which oxygen atoms may be replaced by sulfur atoms, this group is replaced in known manner by a possibly N-substituted carbamoyloxy group in which oxygen atoms may be replaced by sulfur, or by a quaternary amino group and, if desired, the resulting compound is converted into a metal salt thereof, such as its alkali or alkaline earth metal salts, or salts with ammonia or with organic bases, or from resulting salts the free carboxylic acids or, if $R_3$ is basic, inner salts are formed.

The acylation is performed according to methods known for the acylation of aminoacids, especially 7–ACA, for example, with the aid of an acid halide, for example acid chloride, or of a mixed anhydride, for example an anhydride with mono-esterified carbonic acid or with pivalic acid, or preferably with trichloracetic acid or with the free acid itself in the presence of a condensing agent, such as a carbodiimide, for example dicyclohexylcarbodiimide.

Preferred use is made of starting materials that give rise to the above-mentioned particularly active final products.

The cephalosporin derivatives used as starting materials are known or are accessible by known methods.

The compound of the Formula II, in which $R_3$ is a hydroxyl group, is advantageously prepared by the process of British specification 1,080,904, and the compound of the Formula II, in which $R_3$ is a heterocyclic base, especially pyridine, by the processes of Belgian specifications 650,444 and 650,445.

The replacement of the acetoxy group by a carbamoyloxy group has been described in Belgian specification 654,039 and the replacement by a thiocarbamoylmercapto group in Belgian specification 637,547. The exchange of the acetoxy group for the substituents mentioned above can be effected by the process of British specification 912,541 or Belgian Pat. 617,687.

The invention includes also any variant of the process in which an intermediate obtained at any stage of the process is used as starting material and any remaining steps are carried out, or in which the process is discontinued at any stage thereof, or in which the starting materials are formed under the reaction conditions or the reactants may be present in the form of their salts.

The new compounds may be used as medicaments, for example in the form of pharmaceutical preparations containing them in conjunction or admixture with an organic or inorganic, solid or liquid pharmaceutical excipient suitable for enteral, local or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or may contain assistants such a preserving, stabilizing, wetting or emulsifying agents, solution promoters, salts for regulating the osmotic pressure or buffers; they may also contain other therapeutically useful substances. The preparations are formulated by the usual methods.

The following examples illustrate the invention.

In the examples, "MIC" means the minimum inhibitory concentration which is measured either by the serial dilution method commonly employed in testing antimicrobial compounds using as the nutrient medium heart-brain-infusion broth, or, when indicated, by the gradient plate test described in "Antibiotics," vol. I, by Gottlieb and Shaw, New York, 1967, p. 508. The MIC is determined on strains of *Staphylococcus aureus* and *Escherichia coli* found in hospitals. *Staph. aureus* 2999 is a strain which is resistent to penicillin, *Staph. aureus* SG 511 is sensitive to penicillin.

EXAMPLE 1

About 20 g. (0.2 mol) of phosgene are condensed in a sulfating flask of 300 ml. capacity which is equipped with an agitator, with the aid of an acetone+carbon dioxide bath. Then 17.0 g. (0.11 mol) of solid malonic acid dimethyl ester monosodium salt are added under nitrogen with stirring at −10° C., and the batch is allowed to react for ½ hour at −10° C. The excess phosgene is allowed to evaporate at room temperature and after a short evacuation the residue is dissolved in 50 ml. of methylenechloride. A solution of 27.2 g. (0.1 mol) of 7-aminocephalosporanic acid and 28 ml. (0.2 mol) of triethylamine in 100 ml. of methylenechloride is then dropped in at −10° C. and the whole is stirred for ½ hour at −10° C. The reaction mixture is then stirred into 380 ml. of 10% aqueous dihydric potassium phosphate, whereupon the pH value reaches 5.2. The methylenechloride layer is separated and the aqueous phase washed twice more with methylenechloride, acidified with concentrated hydrochloric acid to a pH value of 2.0, saturated with sodium chloride and extracted with ethyl acetate. When this extract is dried over sodium sulfate and evaporated under vacuum, it furnishes 28.58 g. of crude product, which is dissolved in 150 ml. of methanol, mixed with 26 ml. of a 3 N solution of the sodium salt of α-ethylcaproic acid in methanol and allowed to crystallize for 3 hours at −20° C. Filtration furnishes 2.85 g. of a crystalline by-product that is antibacterially active and reveals the following $R_f$ values in the thin-layer chromatogram or silicagel: System I (n-butanol+glacial acetic acid+water 75:7.5:21): $R_f$=0.09; system II (n-butanol+pyridine+glacial acetic acid+water 38:24:8:30): $R_f$=0.49. On addition of ether to the mother liquor 22.19 g. of 7 - (di - [methoxycarbonyl] - acetamino) - cephalosporanic acid sodium salt of the formula

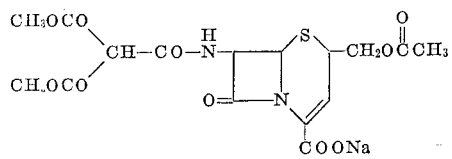

crystallize out. According to its thin-layer chromatogram the substance is unitary. System I: $R_f$=0.33, System II: $R_f$=0.63. MIC: *Staph. aureus* SG 511=2γ/ml.; *Escherichia coli* 2018=16γ/ml.

EXAMPLE 2

A solution of 530 mg. of malonic acid monoethyl ester (4 millimols) and 0.28 ml. of triethylamine (2 millimols) in 1 ml. of absolute methylenechloride is mixed at −15° C. with 0.23 ml. of trichloroacetylchloride (2 millimols) in 1 ml. of absolute methylenechloride, and the mixture is allowed to react for 20 minutes at −15° C.

A cold solution of 272 mg. of 7-aminocephalosporanic acid (1 millimol) and 0.28 ml. of triethylamine (2 millimols) in 1 ml. of absolute methylenechloride is then added and the whole is stirred for 30 minutes at −15° C.

The reaction mixture is stirred into 2 ml. of 10% aqueous dihydric sodium phosphate buffer which has been adjusted to pH=6.5 with 10% aqueous dibasic sodium phosphate buffer, whereupon the pH value drops to 3.8.

The whole is adjusted with 4 N sodium hydroxide solution to a pH value of 5.5 and the organic phase is separated; the methylenechloride is dried over sodium sulfate and evaporated to yield the sodium salt of ethoxycarbonyl-acetamino-cephalosporanic acid of the formula

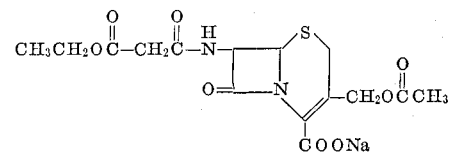

which is purified by being dissolved in acetone and crystallized from ethyl acetate.

The new compound is readily soluble in water, formamide and methanol, sparingly soluble in benzene and ether.

Ultraviolet spectrum (in methanol): $\lambda_{max}$=203 mμ (ε=9000), 235 mμ (ε=5800) and 264 mμ (ε=6000).

Infrared spectrum (in Nujol): bands at 2.87, 3.03, 3.06, 3.25 (shoulder), 5.60, 5.74, 5.91, 6.20, 6.45, 7.01, 7.38, 7.45, 7.55, 7.75, 8.02, 8.21, 8.33, 8.48, 8.57, 8.95, 9.44, 9.70, 9.80, 10.02, 10.30, 10.45, 11.15, 11.62, 11.95, 12.36, 12.65, 13.06, 13.45μ.

In the thin-layer chromatogram on silicagel in the system n-butanol+pyridine+acetic acid+water (parts by volume 42:24:4:30), stained with iodine vapour or according to Reindel-Hoppe (Nature, 188, 310–11 [1960]), the $R_f$ value is 0.32; in the system ethyl acetate+n-butanol+pyridine+acetic acid+water (parts by volume 42:21:21:6:10), stained as indicated above, the $R_f$ value=0.35, and in the system n-butanol+pyridine+acetic acid+water (parts by volume 34:24:12:30), stained as indicated above the $R_f$ value=0.52.

EXAMPLE 3

2.3 ml. of trichloracetic acid anhydride (20 millimols) in 10 ml. of absolute methylene chloride are added to a solution of 4.72 g. of malonic acid monomethyl ester (40 millimols) and 2.8 ml. of triethylamine (20 millimols) in 10 ml. of absolute methylene chloride at $-15°$ C.; the whole is then allowed to react at the same temperature. A cold solution of 2.72 g. (10 millimols) of 7-amino-cephalosporanic acid and 2.8 ml. (20 millimols) of triethylamine in 10 ml. of absolute methylene chloride is then added and the reaction mixture stirred for 30 minutes at $-15°$ C.

The reaction mixture is stirred into 20 ml. of aqueous potassium dihydrogen phosphate buffer of 10% strength which has been adjusted to pH 6.5 with aqueous dipotassium hydrogen phosphate buffer, the pH value falling to 2.8.

The methylene chloride is evaporated in vacuo at 30° C., and the remaining aqueous phase is first covered at 0° C. with 100 ml. of ethyl acetate, then adjusted to pH=2 with 4 N hydrochloric acid. After separating the phases, the aqueous layer is washed again twice with 50 ml. of ethyl acetate each time, and the combined organic layers are dried over sodium sulfate and evaporated in vacuo.

The oily evaporation residue is dissolved in 20 ml. of ethyl acetate and filtered through a column (d.=34 mm., h.=120 mm.) of 50 g. of silica gel. The column is rinsed with 300 ml. of ethyl acetate and the ethyl acetate evaporated in vacuo. Methoxycarbonyl-acetylamino-cephalosporanic acid of the formula

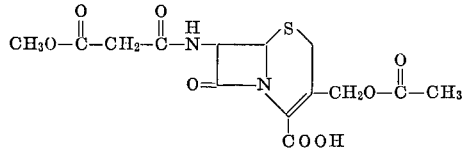

crystallizes out and is recrystallized from methylene chloride.

Ultraviolet spectrum (in rectified spirit) $\lambda_{max}=203$ m$\mu$ ($\epsilon=11,400$) and 261 m$\mu$ ($\epsilon=8,300$). In a thin-layer chromatogram on silica gel in the system n-butanol+pyridine+glacial acetic acid+water (42:24:4:30), colored with iodine vapor the $R_f$ value=0.24; in the system ethyl acetate+n-butanol+pyridine+glacial acetic acid+water (42:21:21:6:10) 0.42; in the system n-butanol+pyridine+glacial acetic acid+water (34:24:12:30) 0.46. MIC in the gradient plate test: *Staph. aureus* SG 511=0.45$\gamma$/ml.; *Staph. aureus* 2999=2$\gamma$/ml.; *Escherichia coli* 2018=20$\gamma$/ml.

What is claimed is:

1. A compound of the Formula I

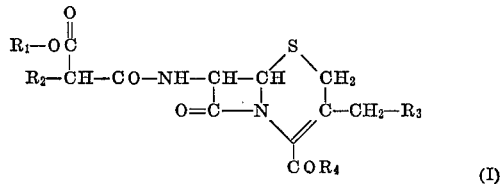

wherein $R_1$ represents lower alkyl, $R_2$ hydrogen or lower alkoxycarbonyl, $R_3$ represents a member selected from the group consisting of hydroxy, lower alkylcarbonyloxy, lower alkyl-thiocarbonyloxy, lower alkyl-carbonylmercapto, lower alkyl-thiocarbonylmercapto, unsubstituted and substituted benzoyloxy, unsubstituted and substituted benzoylthio, the substituents being lower alkyl, lower alkoxy, lower alkyl-mercapto, halogen or nitro, an N-substituted carbamoyloxy group of the formula

—X—CX—NH—R$_5$ in which $R_5$ is a member selected from the group consisting of lower alkyl, lower alkoxy-lower alkyl and halo-lower alkyl and X is a member selected from the group consisting of oxygen and sulfur, and a pyridinium group, and $R_4$ represents a hydroxyl group, and their therapeutically useful salts.

2. A compound of the Formula I as claimed in claim 1, wherein $R_1$ represents lower alkyl and $R_2$ stands for a hydrogen atom or lower alkoxycarbonyl, $R_3$ for the acetoxy group, and $R_4$ for a hydroxyl group, and its therapeutically useful salts.

3. A compound of the Formula I as claimed in claim 1, wherein $R_1$ represents lower alkyl, $R_2$ stands for a hydrogen atom or lower alkoxycarbonyl, $R_3$ for a pyridinio group, and $R_4$ for a negatively charged oxygen atom.

4. A compound of the Formula I as claimed in claim 1, wherein $R_1$ represents lower alkyl radical, $R_2$ stands for a hydrogen atom or lower alkoxycarbonyl, $R_4$ for the hydroxyl group and $R_3$ for a carbamoyloxy group of the formula

—O—CO—NH—R$_5$ in which $R_5$ represents a lower alkyl radical which is unsubstituted or substituted by one or more loweralkoxy groups or halogen atoms and its therapeutically useful salts.

5. A compound of the Formula I as claimed in claim 1, wherein $R_1$ represents lower alkyl, $R_2$ stands for a hydrogen atom or lower alkoxycarbonyl, $R_4$ for the hydroxyl group, and $R_3$ for a lower alkylcarbamoyloxy group substituted by one or more chlorine atoms, and its therapeutically useful salts.

6. A compound of the Formula I as claimed in claim 1, wherein $R_1$ represents lower alkyl, $R_2$ stands for a hydrogen atom or lower alkoxycarbonyl, $R_4$ for the hydroxyl group, and $R_3$ for the $\beta$-chlorethylcarbamoyloxy group, and its therapeutically useful salts.

7. A compound of the Formula I as claimed in claim 1, wherein $R_1$ represents methyl, $R_2$ hydrogen, $R_3$ acetoxy and $R_4$ hydroxyl, and its therapeutically useful salts.

8. A compound of the Formula I as claimed in claim 1, wherein $R_1$ represents methyl, $R_2$ methoxycarbonyl, $R_3$ acetoxy and $R_4$ hydroxyl, and its therapeutically useful salts.

9. A compound of the Formula I as claimed in claim 1, wherein $R_1$ represents ethyl, $R_2$ hydroxy, $R_3$ acetoxy and $R_4$ hydroxyl, and its therapeutically useful salts.

References Cited

UNITED STATES PATENTS 3,338,897   8/1967   Takano et al.  _____ 260—243

NICHOLAS S. RIZZO, Primary Examiner

U.S. Cl. X.R.

424—246